United States Patent
Tamir et al.

(10) Patent No.: US 7,394,783 B2
(45) Date of Patent: Jul. 1, 2008

(54) DEVICE AND METHODS FOR INCREASING WIRELESS CONNECTION SPEEDS

(75) Inventors: Tal Tamir, Even Yehuda (IL); Doron Rainish, Ramat Gan (IL); Roni Sasson, Tel Aviv (IL); David Ben-Eli, Modiin (IL)

(73) Assignee: Intel Corporation, Santa Clara, CA (US)

( * ) Notice: Subject to any disclaimer, the term of this patent is extended or adjusted under 35 U.S.C. 154(b) by 519 days.

(21) Appl. No.: 10/945,797

(22) Filed: Sep. 21, 2004

(65) Prior Publication Data

US 2006/0062174 A1    Mar. 23, 2006

(51) Int. Cl.
*H04Q 7/00* (2006.01)
*H04M 1/00* (2006.01)
*H04B 17/00* (2006.01)

(52) U.S. Cl. ............... 370/328; 455/552.1; 455/553.1; 455/67.13; 455/135; 455/295; 455/574; 370/311

(58) Field of Classification Search .............. 455/552.1, 455/553.1, 67.13, 135, 295, 296, 574, 426.1; 370/311; 702/81–84; 375/147
See application file for complete search history.

(56) References Cited

U.S. PATENT DOCUMENTS

| | | | |
|---|---|---|---|
| 6,223,053 B1 * | 4/2001 | Friedmann et al. | 455/552.1 |
| 6,560,443 B1 * | 5/2003 | Vaisanen et al. | 455/73 |
| 2002/0098864 A1 * | 7/2002 | Mukai et al. | 455/552 |
| 2004/0018854 A1 * | 1/2004 | Gorsuch | 455/553.1 |
| 2004/0058701 A1 * | 3/2004 | Jung et al. | 455/522 |
| 2004/0218522 A1 * | 11/2004 | Sundstrom et al. | 370/208 |
| 2004/0259589 A1 * | 12/2004 | Bahl et al. | 455/553.1 |

* cited by examiner

*Primary Examiner*—Duc M. Nguyen
*Assistant Examiner*—Daniel Lai
(74) *Attorney, Agent, or Firm*—Schwegman, Lundberg & Woessner, P.A.

(57) ABSTRACT

Systems and methods may operate to increase the throughput of a wireless connection by passing a wireless signal from a communications subsystem to an application subsystem for physical layer processing of the wireless signal. Other embodiments include systems and methods for selectively activating a processor of an application subsystem when an improvement in wireless throughput is possible.

8 Claims, 6 Drawing Sheets

DEVICE AND METHODS FOR INCREASING WIRELESS CONNECTION SPEEDS

TECHNICAL FIELD

Various embodiments described herein relate to wireless communications generally, including apparatus, systems and methods for increasing wireless connection speeds.

BACKGROUND

More and more consumers are using wireless devices to remain connected to the world around them. Cell phone users can retrieve movie listings while driving down the road to the theater. Computer users can sit in a coffee shop and retrieve their email any time of the day. As users become more and more familiar with the myriad ways that wireless connectivity improves their life, they begin to demand faster and more reliable connections.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description of embodiments of the invention, reference is made to the accompanying drawings which form a part hereof, and in which is shown by way of illustration specific embodiments in which the subject matter may be practiced.

Reference is made in the detailed description to communications layers. It is to be understood that such layers refer to the layers of the Open System Interconnection (OSI) model.

The "physical layer" or layer 1 refers to any system for the transmission and reception of bits from one device to another which regulates the transmission over a physical medium, such as a wireless communications link.

The "data link layer" or layer 2 packages raw bits from the physical layer into logical, structured data packets.

The "network layer" or layer 3 determines the route from the source to the destination device and manages operations such as switching, routing and controlling packet congestion.

The "transport layer" or layer 4 receives packets from and sends packets to the network layer as well as sending receipt acknowledgments.

Typically, information travels down the layer model, e.g. from the transport to the network, the data link, and to the physical and is then transmitted over the medium to some device which receives at the "physical layer", and then sends the information up the layer model to the data link, the network, and to the transport layers, in that order. It will be appreciated by those skilled in the art that there are additional layers to the OSI model, but for the purposes of this description, these layers will be sufficient to understand and carry out embodiments of the present invention.

Figure 1:
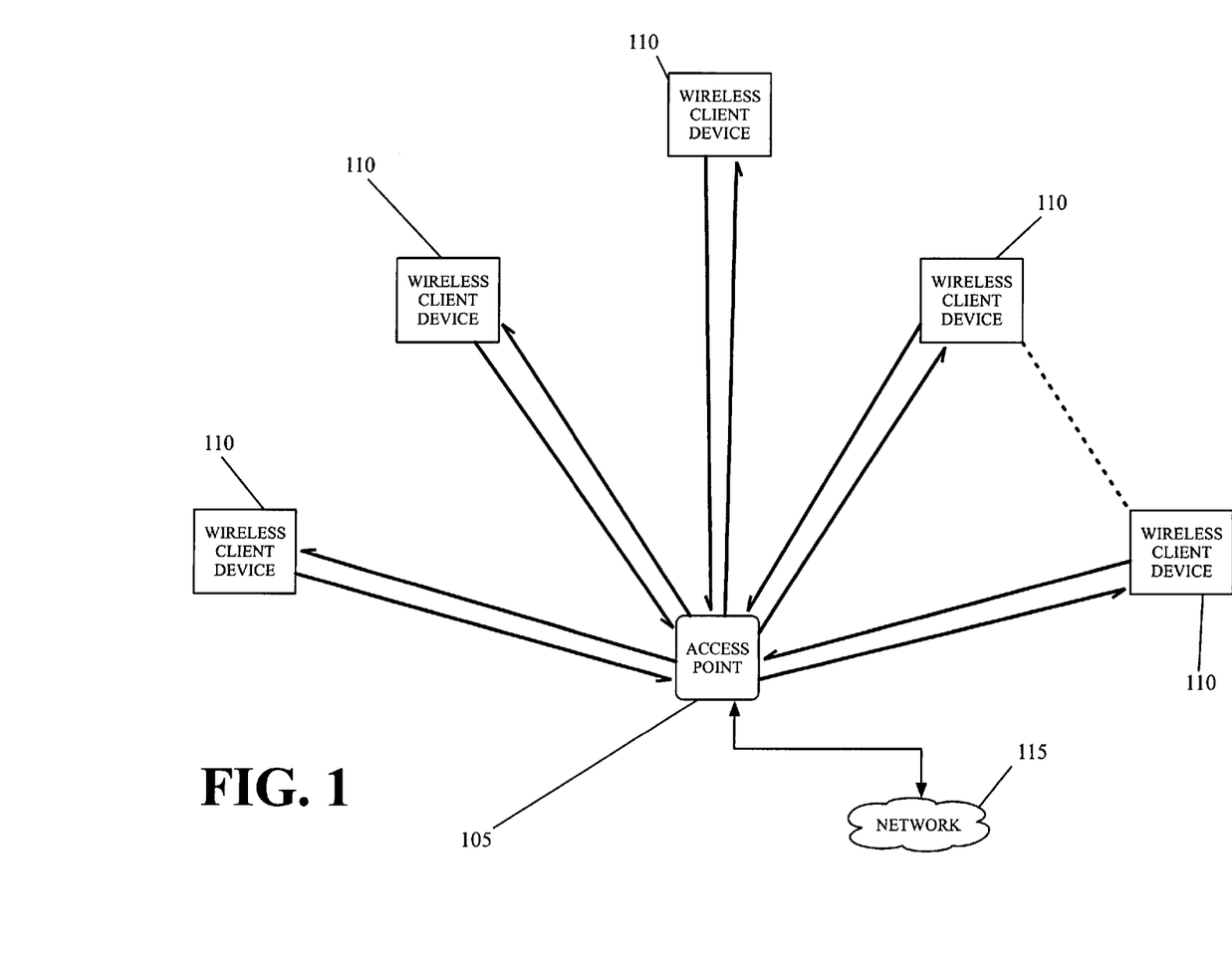
FIG. 1 is a high-level block diagram of networked devices according to embodiments of the present invention.

FIG. 1 is a high-level block diagram of networked devices according to embodiments of the present invention. In an embodiment, an access point 105 provides wireless connectivity to a plurality of wireless client devices 110. Connectivity includes transmitting wireless signals to and receiving wireless signals from the plurality of wireless client devices 110. Wireless data signals may include, without limitation: Global System for Mobile Communications (GSM); General Packet Radio Service (GPRS); Code Division Multiple Access (CDMA); Time Division Multiple Access (TDMA); IEEE 802.11 standard signals, IEEE std. 802.11-1999, published 1999 and later versions (hereinafter IEEE 802.11 standard); IEEE 802.16 standard signals, IEEE std. 802.16-2001, published 2001 and later versions (hereinafter IEEE 802.16 standard); Wide Band CDMA (WCDMA); High Speed Downlink Packet Access (HSDPA); or Ultra WideBand (UWB). Though specific types of wireless signals are listed, for the embodiments herein it is to be appreciated that any signal that passes between two devices without a wire is considered to be a wireless signal.

In an embodiment, the access point 105 is any device that is capable of transmitting and receiving wireless signals from at least one wireless client device 110 and providing a connection to a suitable network 115. In an embodiment the access point 105 comprises a radio-frequency (RF) transmitter and receiver and a network interface. Though reference is made to RF, it is to be appreciated that other types of wireless signals may be communicated between the access point 105 and the wireless client device 110, such as, infrared signals, microwave signals and the like. The access point 105 may be connected to any suitable network 115, such as the Internet or a private network.

In a further embodiment, the access point 105 may alternatively be called a base station. In another embodiment, there may be more then one access point 105 providing a wireless network to any number of wireless client devices 110, and that the suitable network 115 in such a case may be a connection with a further access point 105, which is either connected to a suitable network 115 or further connected to other access points 105.

In an embodiment, the wireless client device 110 provides a user the ability to wirelessly connect to a suitable network 115, such as the Internet or a private network. The wireless client device 110 may include, without limitation, a cellular telephone, a personal digital assistant (PDA), a laptop computer, a desktop computer, an internet appliance or any device capable of receiving and/or transmitting wireless data signals to another device. Though the transmission between the wireless client device 110 and the access point 105 in FIG. 1 is depicted as being bi-directional, it should be appreciated that the wireless client device 110 may exclusively either just transmit signals to or receive signals from the access point 105, such that the communications between them are essentially uni-directional. In an embodiment, all wireless client devices 110 use the same type of wireless signal to connect to the access point 105. In another embodiment, the wireless client devices 110 connect to the access point 105 using differing wireless signal types. In a further embodiment, the wireless client devices 110 use the most cost-effective wireless signal to connect to the access point 105.

Figure 2:
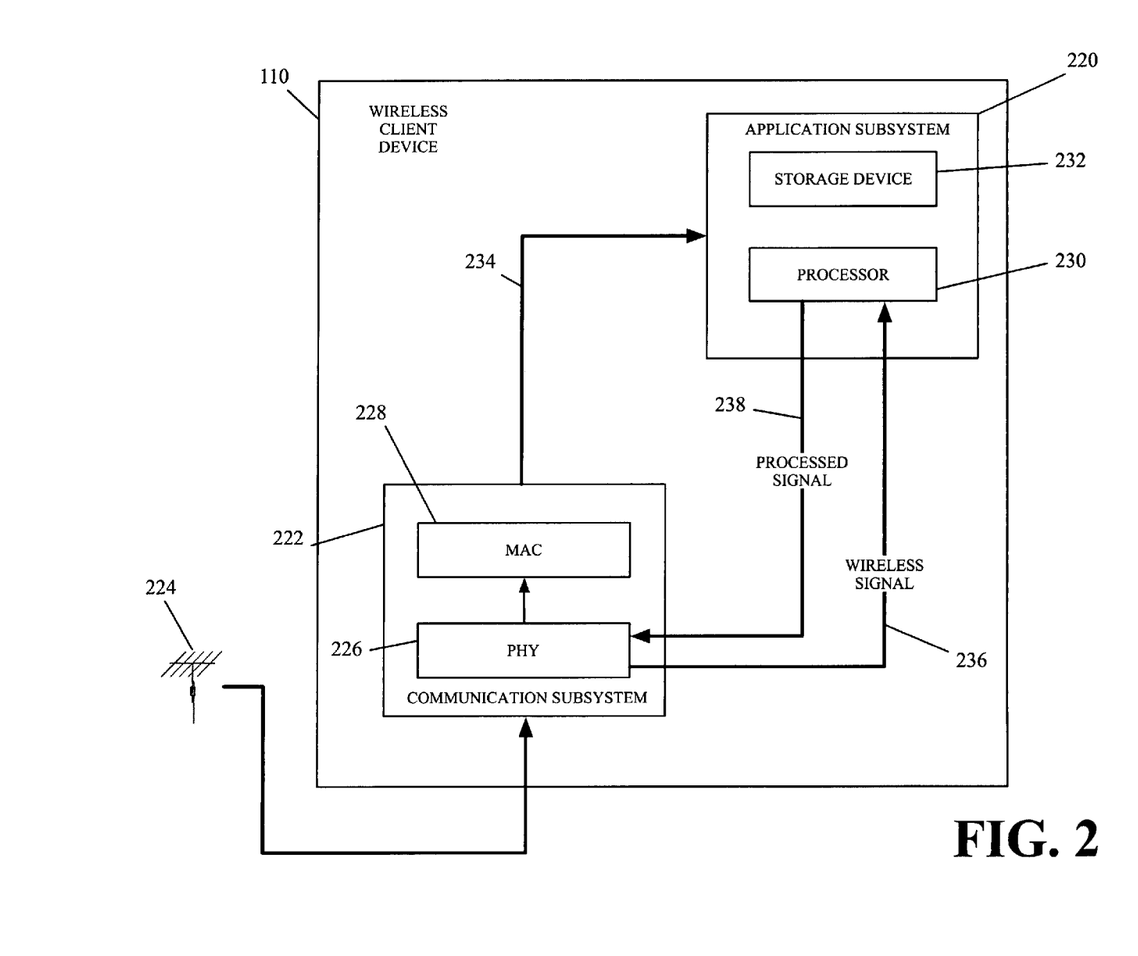
FIG. 2 is a high-level block diagram of a device as depicted in FIG. 1, according to embodiments of the present invention.

FIG. 2 is a high-level block diagram of a device as depicted in FIG. 1, according to embodiments of the present invention. In an embodiment, the device is a wireless client device 110 as contemplated by FIG. 1. The wireless client device 110 comprises two main subsystems that are operably coupled, an application subsystem 220 and a communication subsystem 222. The communication subsystem 222 is further operably coupled to an antenna 224. Though drawn as external to the wireless client device 110, it will be understood by those skilled in the art that such antenna 224 may be integral to the wireless client device 110 in some embodiments. Further, the antenna 224 may be contained in the physical layer (PHY) device 226 of the communication subsystem 222.

In an embodiment, the communication subsystem 222 comprises a PHY device 226 and a media access control (MAC) device 228. In a further embodiment, the communication subsystem 222 further comprises one or more processors that are capable of receiving and transmitting network data signals, including, but not limited to, wireless signals. The processors may include, without limitation, digital signal processors (DSP's) or general-purpose microprocessors. In a further embodiment, the communication subsystem 222 is capable of executing a real-time operating system and associated functions.

In FIG. 2 the one or more processors, not shown, are contained within the PHY device 226 of the communication subsystem 222. The PHY device 226 is further coupled to the antenna 224, which receives a wireless signal. In an embodiment, the PHY device 226 receives a wireless signal from the antenna 224 and performs required processing on the signal at the physical layer. This may include the retrieval and execution of a DSP algorithm. The processed signal is passed to the media access control (MAC) device 228, for layer 2 and layer 3 processing. In an embodiment of the present invention, as is depicted in FIG. 2, the wireless signal received by the antenna 224 is passed to the PHY device 226, which in turn passes it to a processor 230 of the application subsystem 220. In an embodiment of the present invention, the DSP algorithms are executed by the processor 230 of the application subsystem 220. In a further embodiment of the present invention, the processor 230 of the application subsystem 220 is selectively used for the processing of the DSP algorithms.

In an embodiment, the application subsystem 220 comprises a processor 230 and a storage device 232. In an embodiment, the application subsystem 220 consists of one or more processors 230 capable of running user applications and an operating system. Processors 230 on the application subsystem 220 may include, without limitation, Intel XScale processors, Intel Pentium processors, graphics processors, and the like. It will be understood that the application subsystem 220 may also be called the central processing unit (CPU) of a computing device. The application subsystem 220 receives a data signal 234 from the communication subsystem 222 at the transport layer, or layer 4, for further processing as network data information. In an embodiment of the present invention, the processor 230 processes a wireless signal 236 and then passes the processed signal 238 to the PHY device 226 of the communication subsystem 222 at the physical layer. In an alternate embodiment, the PHY device 226 first pre-processes the received signal before passing the wireless signal 236 to the processor 230 of the application subsystem 220. The PHY device 226 receives the processed signal 238 from the processor and passes the signal the MAC device 228 for further processing and from which a data signal 234 is passed to the application subsystem 220. In another embodiment, the PHY device 226 passes the received signal from the antenna 224 without any pre-processing to the processor 230 of the application subsystem 220 and upon receiving the processed signal 238, post-processes the processed signal 238 before passing it to the MAC device 228 for further processing from which a data signal 234 is passed to the application subsystem 220.

In one embodiment of the wireless client device 110 the antenna 224 is operably coupled to the PHY device 226 of the communication subsystem 222 and receives wireless signals and passes those signals to the PHY device 226. The antenna 224 may include one or more of a patch, omni-directional, beam, monopole, dipole, and rhombic antenna, among others.

Figure 3A:
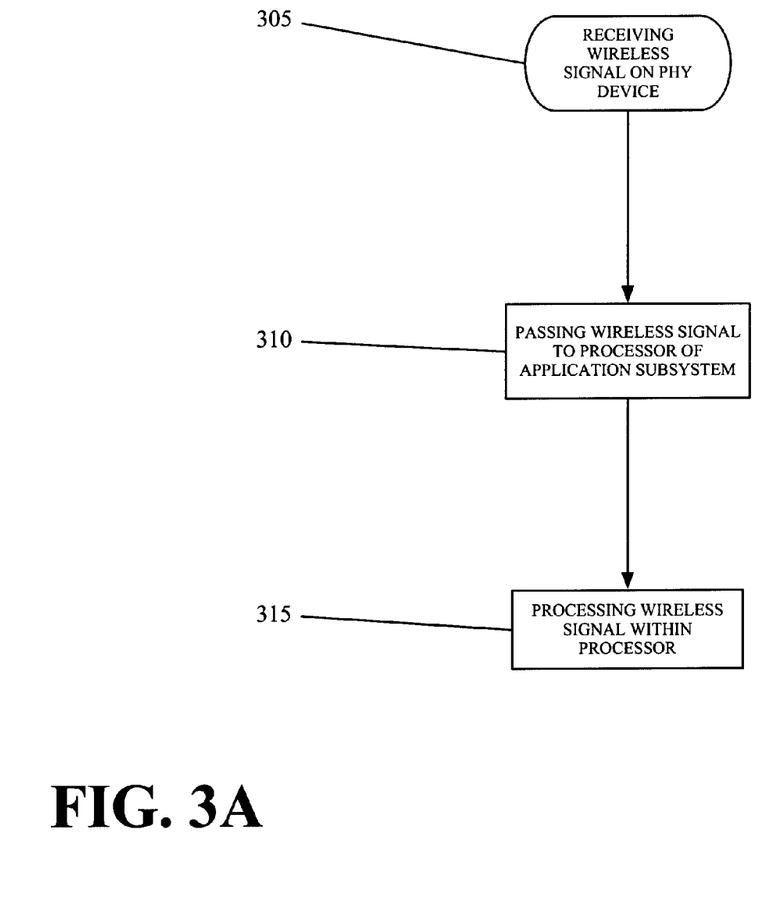
FIG. 3A is a flowchart of a high level method according to embodiments of the present invention to be used by a device as contemplated by FIG. 2.

FIG. 3A is a flowchart of a high level method according to embodiments of the present invention to be used by a device as contemplated by FIG. 2. At block 305 a wireless signal is received, such as by the PHY device 226 of a communication subsystem 222 shown in FIG. 2. At block 310 the wireless signal 236 is passed at the physical layer from the PHY device 226 to the processor 230 of the application subsystem 220. At block 315, the wireless signal is processed within the processor 230 of the application subsystem 220. The processor 230 processes the wireless signal 236 and then passes the processed signal 238 to the PHY device 226 at the physical layer. In an embodiment, the processed signal 238 is then passed by the PHY device 226 to the MAC device 228 for Layer 2 and Layer 3 processing. In another embodiment, the PHY device 226 further processes the processed signal 238 before passing it to the MAC device 228 for further processing before passing the data signal 234 to the application subsystem. The MAC device 228 passes a data signal to the application subsystem 220 at the transport layer, or layer 4. In an alternate embodiment, the signal is passed from the MAC device 228 to the application subsystem 220 at a layer higher then the physical layer.

Figure 3B:
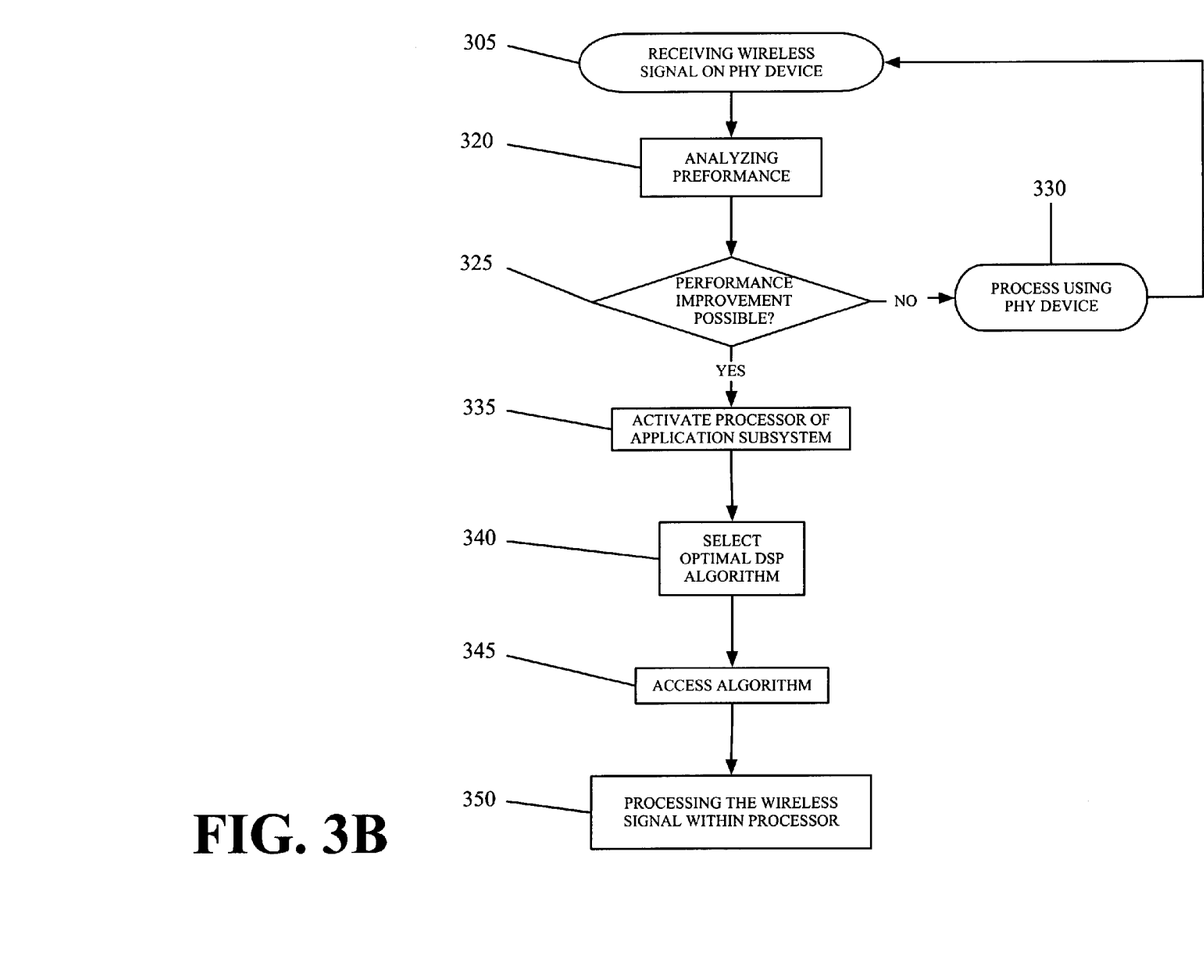
FIG. 3B is a flowchart of a more complex method according to embodiments of the present invention to be used by a device as contemplated by FIG. 2.

FIG. 3B is a flowchart of a more complex method according to embodiments of the present invention to be used by a device as contemplated by FIG. 2. At block 305 a wireless signal is received by the PHY device 226 of a communication subsystem 222. The communication subsystem 222 monitors at least one aspect of wireless performance and analyzes at block 320 the at least one aspect of wireless performance. Aspects of wireless performance which are monitored include, bit error rate, block error rate, frame error rate, throughput, signal to noise plus interference ratio (known in the art as SINR), where interference may include self interference like inter symbol interference and external interferences. In a further embodiment, the communication subsystem 222 monitors any condition that may affect the performance of wireless communications. In an embodiment, the communication subsystem 222, at block 325 makes a determination if an improvement in the at least one aspect of wireless performance is possible. In another embodiment, the determination made at block 325 is positive only if a significant improvement is possible, such as if some percentage increase in throughput is found possible. In a further embodiment, the communication subsystem 222, at block 325 makes a determination if an improvement of at least some percentage of current performance of the at least one aspect of wireless performance is possible. If the determination at block 325 is made that no improvement is possible, the communication subsystem 222 processes the wireless signal internally without the utilization of the processor 230 of the application subsystem 220 at block 330.

If the determination is made that at least one aspect of wireless performance can be improved at block 325, the processor 230 of the application subsystem 220 is activated at block 335. In an embodiment, at block 340 the communication subsystem 222 selects a DSP algorithm that is optimally configured to address the conditions that the wireless client device 110 is currently experiencing. In an embodiment, the communication subsystem 222 instructs the application subsystem 220 to access the optimal algorithm at block 345. In one embodiment, the algorithm is stored on and accessed from the storage device 230 of the application subsystem 220. In another embodiment, the algorithm is stored on and accessed from a storage device operably coupled to the application subsystem 220 but not contained therein. In a further embodiment, the communication subsystem 222 accesses the algorithm from the storage device that is operably coupled to the communication subsystem 222 and transmits the algorithm with the wireless signal 236 to be processed. Using the algorithm accessed at block 345, the wireless signal 236 is processed by the processor 230 of the application subsystem at block 350 and passed back to the PHY device 226 of the communication subsystem 222 as a processed signal 238 which is further processed by the MAC device 228 and passed to the application subsystem 220 as a data signal 234. In an alternate embodiment, the processed signal 238 is further processed by the PHY device 226 before being passed to the MAC device 228 for processing.

It is to be appreciated that the method embodied in FIG. 3B and the accompanying description above may be one of multiple methods used for the processing of a wireless signal. In such an example, a first aspect of wireless performance may be used to determine if the processor 230 is to be initially activated, but other aspects of wireless performance may be used to determine if the processor 230 will continue to be activated and used for the processing of the wireless signal 236. Further the determination at block 325 of FIG. 3B may include many nested determinations, such that a first determination that improvement is not possible, followed by a second determination that improvement is possible, can result in the processor 230 being activated at block 330. Alternatively a first determination that improvement is possible, followed by a second determination that improvement is not possible, can result in the processor 230 not being activated at block 335, but rather the wireless signal 236 being processed by the PHY device at block 330.

Figure 3C:
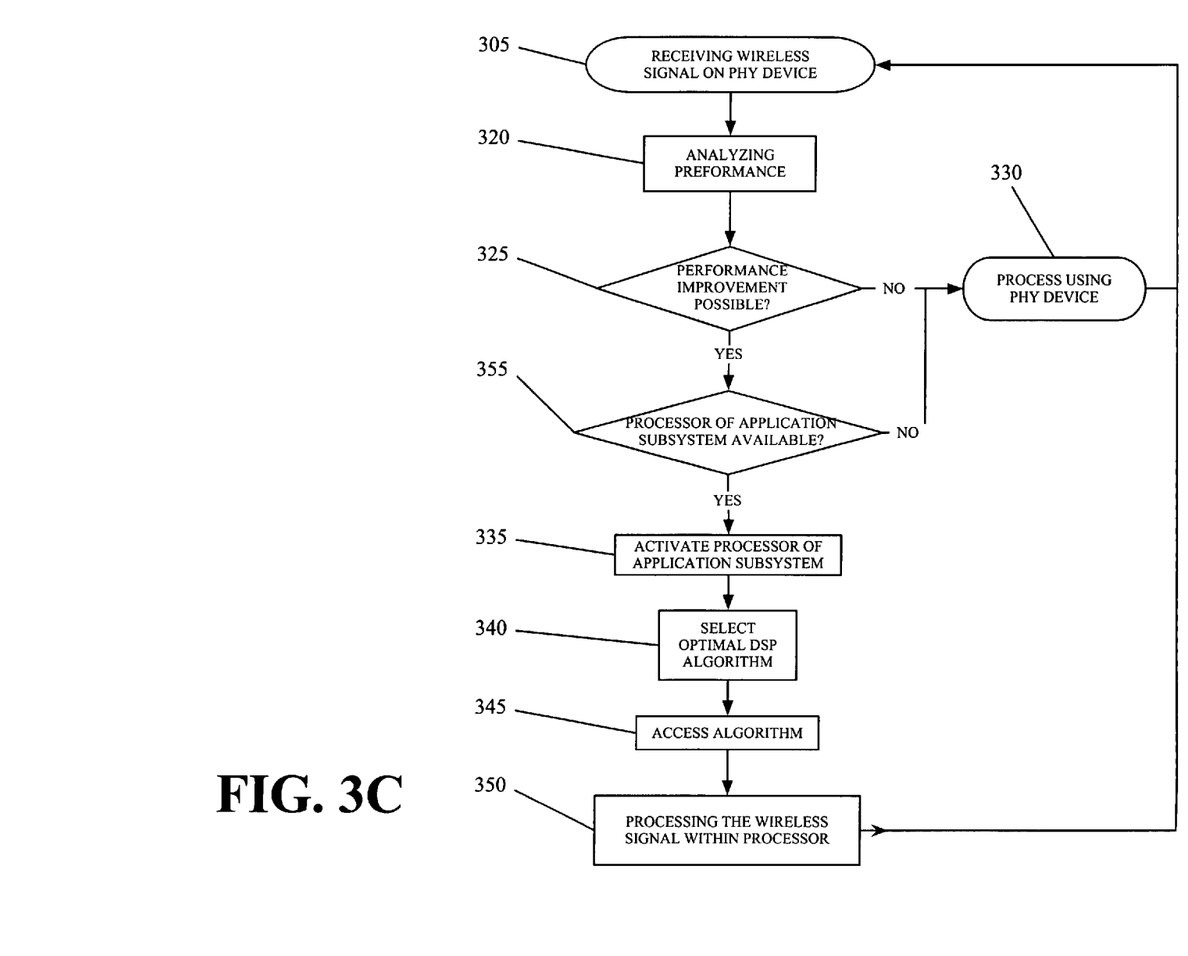
FIG. 3C is a flowchart of a more complex method according to embodiments of the present invention to be used by a device as contemplated by FIG. 2.

FIG. 3C is a flowchart of a more complex method according to embodiments of the present invention to be used by a device as contemplated by FIG. 2. FIG. 3C is similar to the FIG. 3B, but with the addition of an additional decision point at block 355. At block 355, the communication subsystem 222 determines if the processor 230 of the application subsystem 220 is available following a determination at block 325 that performance improvement is possible. The processor 230 is available unless there is a reason it is not available. Reasons for the processor 230 not being available include, without limitation, the processor 230 is in a power-save mode, the processor 230 is no longer functioning, the processor 230 is in sleep mode, the processor 230 is executing a processor-intensive task, such as video rendering, or the algorithm that is optimal for the current conditions as determined by the communication subsystem 222, is stored on the communication subsystem 222. If the processor 230 is unavailable due to any of these reasons, or for any reason not listed, the communication subsystem 222 processes the wireless signal at block 330. If it is first determined that performance improvement is possible and second determined that the processor is available the wireless signal is processed beginning at block 335 according to the methods outlined above.

Figure 3D:
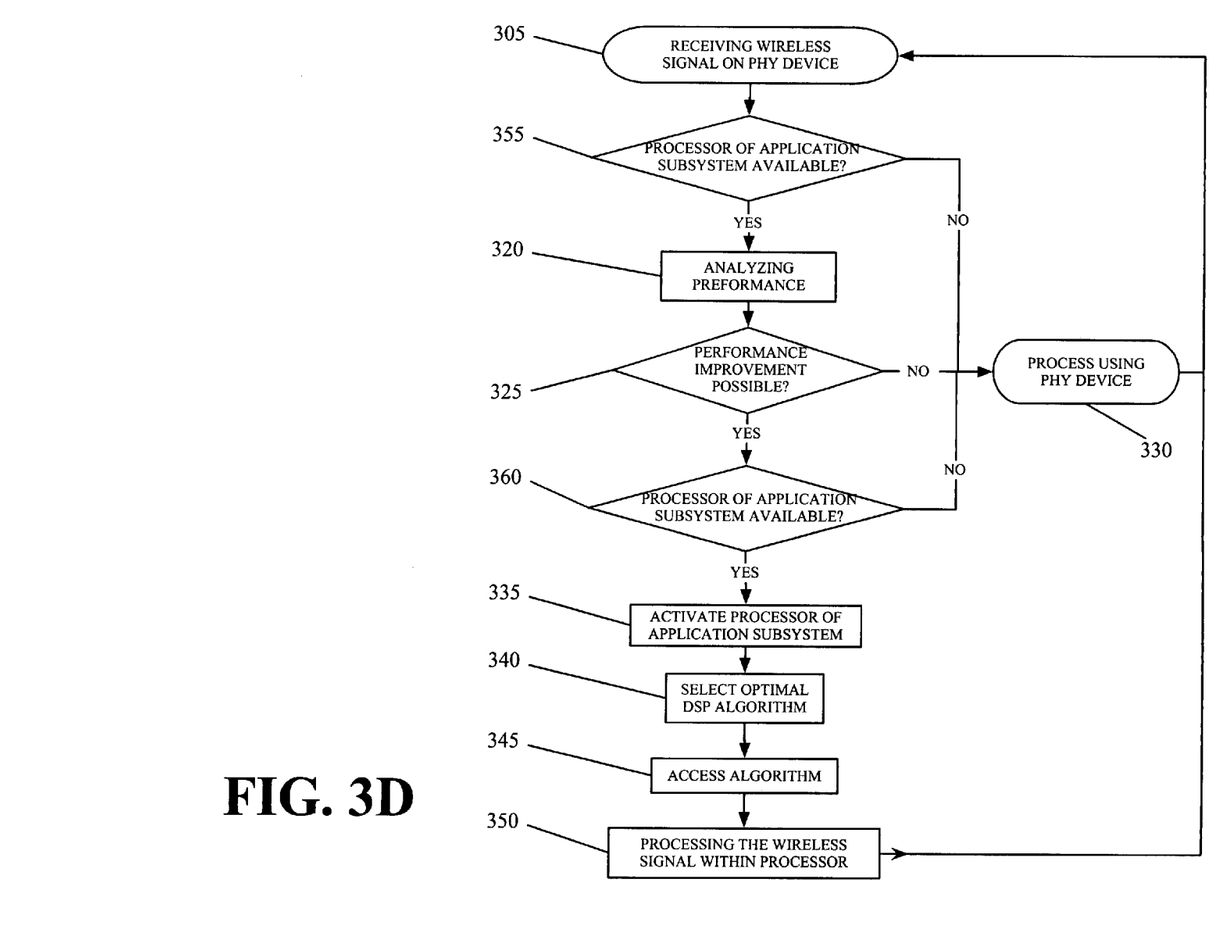
FIG. 3D is a flowchart of an alternative method according to an embodiment of the present invention to be used by a device as contemplated in FIG. 2.

FIG. 3D is a flowchart of an alternative method according to an embodiment of the present invention to be used by a device as contemplated in FIG. 2. FIG. 3D is similar to the FIG. 3D, with an alternate ordering of the decisions points at block 325 and block 355 and an additional decision point at block 360. At block 355, the communication subsystem 222 first determines if the processor 230 of the application subsystem 220 is available. The processor 230 is available unless there is a reason it is not available. Reasons for the processor 230 not being available include, without limitation, the processor 230 is in a power-save mode, the processor 230 is no longer functioning, the processor 230 is in sleep mode, the processor 230 is executing a processor-intensive task, such as video rendering, or the algorithm that is optimal for the current conditions as determined by the communication subsystem 222, is stored on the communication subsystem 222. If the processor 230 is unavailable due to any of these reasons, or for any reason not listed, the communication subsystem 222 processes the wireless signal at block 330. The performance of the wireless signal is analyzed at block 320. At block 325 the communication subsystem second determines if at least one aspect of wireless performance can be improved. If it is determined that at least one aspect of wireless performance can not be improved, the wireless signal is process by the PHY device 226 of the communication subsystem 222 at block 330. If it is determined that at least one aspect of wireless performance can be improved, it is further determined if the processor 230 of the application subsystem 220 is available at block 360, as discussed above, and if such determination is positive the wireless signal is processed beginning at block 335 according to the methods outlined above.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

What is claimed is:

1. A method, comprising:
   receiving a wireless signal on a PHY device of a communication subsystem, the wireless signal at a physical layer;
   analyzing at least one aspect of wireless performance;
   first determining an availability of a processor of an application subsystem, where the processor is operably coupled to the PHY device;
   second determining if the at least one aspect of wireless performance can be improved;
   if it is second determined that the at least one aspect of wireless performance can be improved and first determined that the processor of the application subsystem is available, then activating the processor of the application subsystem to process the wireless signal within the processor of the application subsystem, wherein processing the wireless signal at the processor includes processing the wireless signal at the physical layer to generate a processed signal at the physical layer and passing the processed signal back to the PHY device;
   if it is second determined that at least one aspect of wireless performance can not be improved or first determined that the processor is not available, processing the wireless signal using the PHY device at the physical layer to generate a processed signal at the physical layer;
   determining that at least one other aspect of wireless performance can be improved and that the processor of the application subsystem is available, and continuing to activate the processor and to use the processor for the processing of the wireless signal;
   passing the processed signal from the PHY device to a media access control (MAC) device for layer 2 and layer 3 processing to generate a data signal at a transport layer; and
   passing the data signal at the transport layer from the MAC device back to the application subsystem.

2. The method of claim 1, wherein the processor is available unless any of the following are true: the processor is executing a processor-intensive task, the processor is in a power-save mode; or the processor has ceased performing instruction for any reason.

3. The method of claim 1, wherein the processor is available unless an algorithm that is optimal for current operating conditions of the communication subsystem is contained on the communication subsystem.

4. The method of claim 1, wherein the activating the processor further comprises:
   accessing an algorithm; and
   processing the wireless signal with the accessed algorithm within the processor of the application subsystem.

5. A machine readable medium having machine executable instructions stored on a computer-readable storage device, which when executed perform the following operations:
   receiving an unprocessed wireless signal on a PHY device of a communication subsystem, the wireless signal at a physical layer;
   analyzing at least one aspect of wireless performance;
   first determining an availability of a processor of an application subsystem, where the processor is operably coupled to the PHY device;
   second determining if the at least one aspect of wireless performance can be improved;
   if it is second determined that the at least one aspect of wireless performance can be improved and first determined that the processor of the application subsystem is available, then activating the processor of the application subsystem to process the wireless signal within the processor of the application subsystem, wherein processing the wireless signal at the processor includes processing the wireless signal at the physical layer to generate a processed signal at the physical layer and passing the processed signal back to the PHY device;
   if it is second determined that at least one aspect of wireless performance can not be improved or first determined that processing is not available, processing the wireless signal using the PHY device at the physical layer to generate a processed signal at the physical layer;
   determining that at least one other aspect of wireless performance can be improved and that the processor of the application subsystem is available, and continuing to activate the processor and to use the processor for the processing of the wireless signal;
   passing the processed signal from the PHY device to a media access control (MAC) device for layer 2 and layer 3 processing to generate a data signal at a transport layer; and
   passing the data signal at the transport layer from the MAC device back to the application subsystem.

6. The machine readable medium of claim 5, wherein the processor is available unless any of the following are true: the processor is executing a processor-intensive task, the processor is in a power-save mode; or the processor has ceased performing instruction for any reason.

7. The machine readable medium of claim 5, wherein the processor is available unless an algorithm that is optimal for current operating conditions of the communication subsystem is contained on the communication subsystem.

8. The machine readable medium of claim 5, wherein the activating the processor further comprises:
   accessing an algorithm; and
   processing the wireless signal with the accessed algorithm within the processor of the application subsystem.

* * * * *